United States Patent [19]

Cook

[11] 4,381,857
[45] May 3, 1983

[54] PROGRAMMED OLEO-PNEUMATIC SHOCK ABSORBER

[75] Inventor: William C. Cook, Marietta, Ga.

[73] Assignee: Lockheed Corporation, Burbank, Calif.

[21] Appl. No.: 214,217

[22] Filed: Dec. 8, 1980

[51] Int. Cl.³ ............................ F16F 9/18; F16F 9/50
[52] U.S. Cl. .................................. 267/64.15; 188/279; 188/317; 244/104 FP; 267/64.26
[58] Field of Search .............. 188/280, 281, 284, 313, 188/314, 315, 317, 322.15, 322.22, 279; 267/64.15, 64.25, 64.26, 124, 126; 244/104 FP

[56] References Cited

U.S. PATENT DOCUMENTS

| | | | |
|---|---|---|---|
| 2,379,388 | 6/1945 | Thornhill | 267/64.15 |
| 2,819,064 | 1/1958 | Peras | 267/64.15 |
| 3,168,302 | 2/1965 | Burris | 267/64.25 |
| 3,290,037 | 12/1966 | Robinson, Jr. et al. | 267/64.26 |
| 3,363,894 | 1/1968 | Hill | 267/64.15 |
| 4,088,286 | 5/1978 | Masclet et al. | 244/104 FP |

FOREIGN PATENT DOCUMENTS 668543   3/1952   United Kingdom ................ 188/313

Primary Examiner—Douglas C. Butler
Assistant Examiner—R. R. Diefendorf
Attorney, Agent, or Firm—John J. Sullivan

[57] ABSTRACT

An improved air/oil shock absorber (16) especially adapted for aircraft landing gears (11) is provided whereby the rate of strut (14) compression is programmed separately for the landing impact and for rollout after the landing. During the landing impact, increased tail clearance is achieved by temporarily delaying the last few inches of compression. After the aircraft rotates on to the nose landing gear, the shock absorber (16) slowly compresses to its static position where it then functions in a conventional manner. The shock absorber assembly (16) may be oriented in any position with respect to the aircraft (10) by virtue of two internal air/oil separator pistons (24 and 29).

5 Claims, 4 Drawing Figures

U.S. Patent May 3, 1983 Sheet 1 of 2 4,381,857
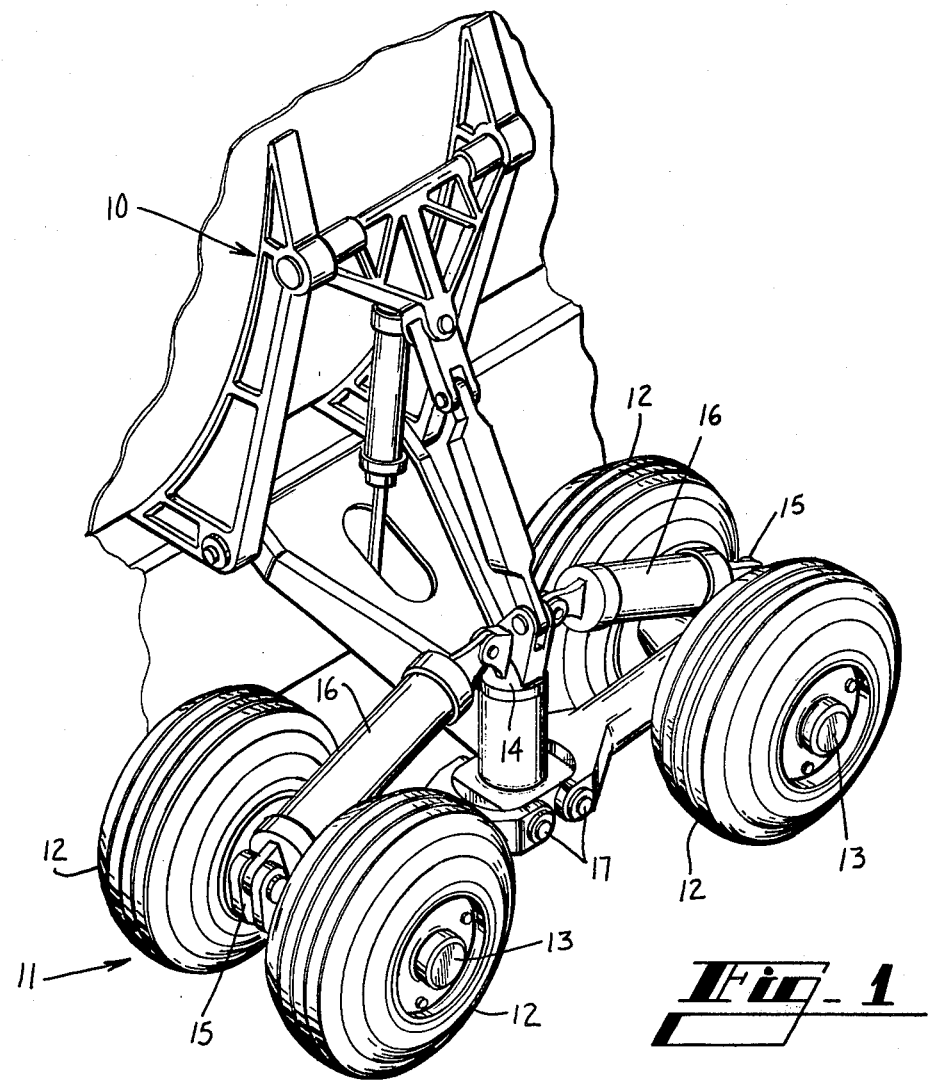
Fig_1
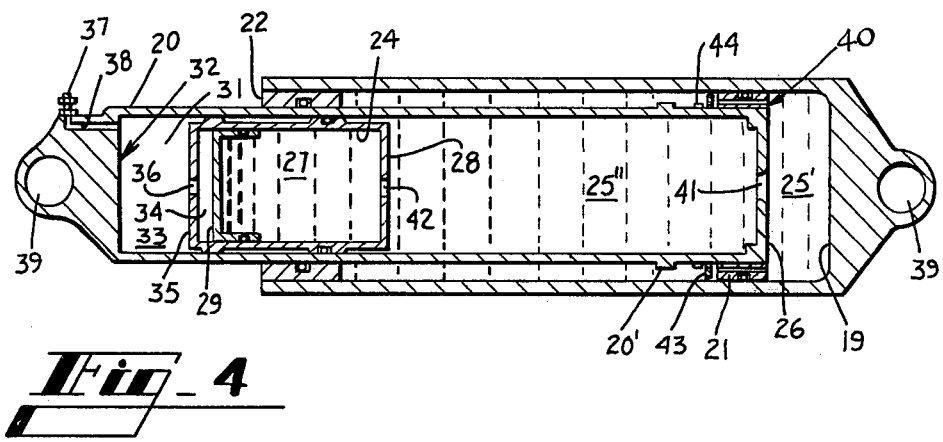
Fig_4

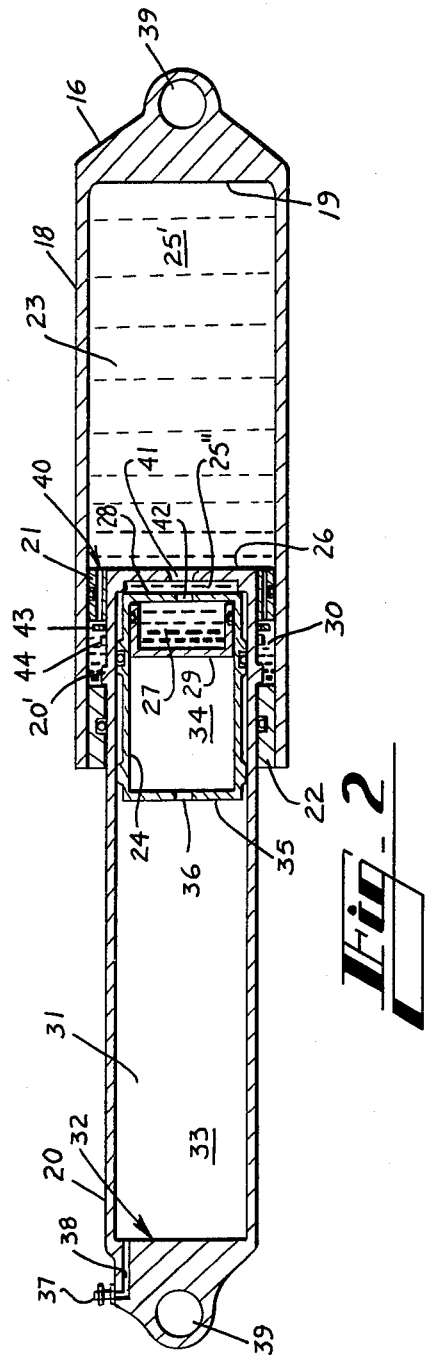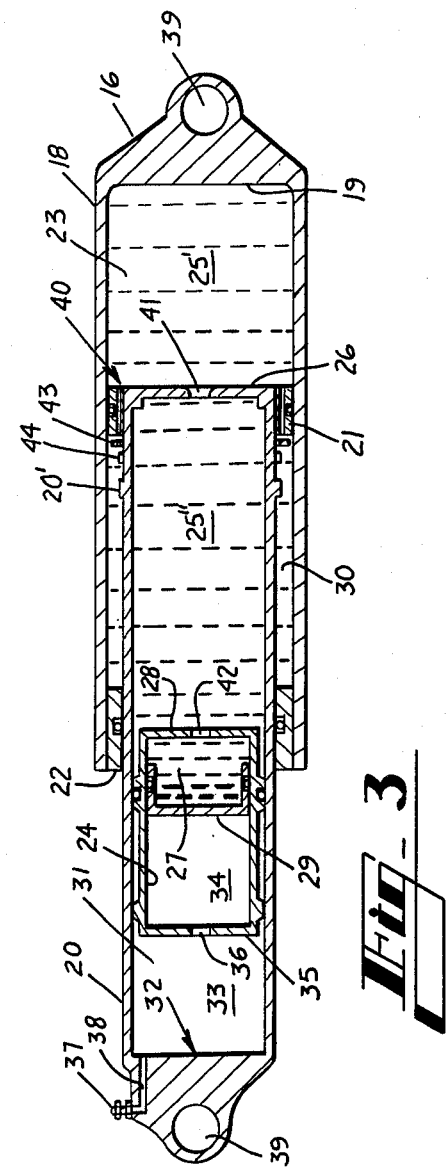

PROGRAMMED OLEO-PNEUMATIC SHOCK ABSORBER

TECHNICAL FIELD

This invention relates to oleo-pneumatic shock absorbers such as those employed on mechanical equipment for example vehicles especially aircraft undercarriages, and more particularly to such a shock absorber wherein the rate of compression is programmed separately as for example in the case of aircraft landing gears for the landing impact and for roll-out subsequent to the impact.

In present day high speed aircraft it is important to reduce the length of runway necessary during landing from touch-down to complete stop by substantially reducing the landing speed. This is effectively accomplished by aircraft attitude adjustments which are effected by, among other things, increased tail clearance provided by programming the landing gear strut compression to thereby vary its overall length in a controlled manner, i.e., at a predetermined rate.

BACKGROUND ART

The prior art, U.S. Pat. No. 3,290,037, provides for an oleo-pneumatic shock absorber for separate programming at landing impact and during subsequent roll-out wherein it is necessary to orient the absorber in or near the vertical position. In the more complex undercarriages employed on some aircraft comprising, for example, multiple wheel units or bogies vertical or near vertical orientation of the absorber may not be desirable nor even possible.

DISCLOSURE OF INVENTION

In accordance with the present invention an oleo-pneumatic shock absorber is provided which may be oriented in any position and still provide the separate landing impact and roll-out programming. At the same time such separation is accomplished in a manner whereby the landing gear strut characteristics including shock absorber compression rate can be controlled more precisely.

More specifically, the shock absorber herein proposed includes a combination of interacting pistons and cylinders in which the relatively compressible air and relatively incompressible oil are isolated one from the other at all times and a plurality of separate orifices for both air and oil flow. This separation also is adapted to allow, where desired, the oil to be depleted completely from the shock absorber to lower the aircraft for cargo loading and unloading.

BRIEF DESCRIPTION OF DRAWINGS

With the above and other objects in view as will become more apparent this invention consists in the arrangement, combination and construction of parts all as hereinafter more clearly described, claimed and illustrated in the accompanying drawings, wherein:

FIG. 1 is a perspective view of a typical aircraft undercarriage or landing gear employing an oleo-pneumatic shock absorber as herein proposed associated with each pair of the fore and the aft wheels comprising the landing gear, only a portion of the aircraft structure in the area of the landing gear being shown;

FIG. 2 is a longitudinal section taken through either one of the shock absorbers shown in FIG. 1 when disposed in the fully extended position corresponding to the position prior to impact of the associated landing gear wheels during the landing operation of the aircraft;

FIG. 3 is a similar view showing the shock absorber disposed in the position at the end of the impact stroke corresponding to the position of the associated wheels at touch-down and at the beginning of the roll-out operation of the aircraft; and FIG. 4 is a similar view showing the position of the shock absorber at the end of the roll-out stroke corresponding to the position of the associated wheels during taxiing of the aircraft.

DETAILED DESCRIPTION AND STRUCTURE OF THE PREFERRED EMBODIMENT

Referring more particularly to the drawings, 10 designates generally the structure of an aircraft to which one of the landing gear units 11 is connected following conventional practice. The landing gear 11 is disposed in the deployed or surface contacting position of the aircraft and includes a pair of fore and a pair of aft wheels 12, each such pair of wheels being mounted on a common axle 13. The oleo-pneumatic shock absorber of the present invention is shown operatively connected between the main support strut 14 and each wheel axle 13 through a crank arm 15. Each shock absorber is designated 16 since they are identical one to the other and the extension and retraction thereof serves to move each pair of associated wheels 12 independently relative to the strut 14 about an axis 17.

Each shock absorber 16 comprises a cylindrical housing 18 closed at one end by an end wall or bulkhead 19. Inside the housing 18 is a slidable hollow cylindrical piston 20 which extends beyond the open end of the housing 18, being retained from separation from the housing 18 by a stop 20' carried by the piston 20 adjacent its inner end. A first bearing 21 mounted on the end of the piston 20 within the housing 18 slides on the inner surface or wall of the housing 18. A second bearing 22 mounted on the inside surface or wall of the housing 18 slides on the outer surface or wall of the piston 20. An oil or hydraulic fluid chamber 23 is formed inside the housing 18 and the piston 20, being defined at one end by the bulkhead 19 and at the other end by a second hollow cylindrical piston, i.e., a first separator piston 24 inside the piston 20. The chamber 23 is subdivided into chambers 25' and 25" by a closure or bulkhead 26 at the end of the piston 20 within the housing 18.

A second oil or hydraulic fluid chamber 27 is formed inside the first separator piston 24 and is defined at the ends by a bulkhead 28 at one end of the first separator piston 24 and a slidable bulkhead which acts as a second separator piston 29 internally of the first separator piston 24. In addition the concentric housing 18 and piston 20 form an annular oil or hydraulic fluid chamber 30 defined at its ends by the bearings 21 and 22.

An air chamber 31 is also formed inside the piston 20 and the first separator piston 24 defined at its ends by the slidable bulkhead or second separator piston 29 and a bulkhead 32 at the outer end of the piston 20. This air chamber 31 is subdivided into chambers 33 and 34 by a bulkhead 35 defining the other end, i.e., the end opposite the bulkhead 28, of the first separator piston 24. An orifice 36 of predetermined size in the bulkhead 35 provides a controlled passage of air between the chambers 33 and 34.

The piston 20 includes a valve 37 which closes the outer end of a passage 38 in the bulkhead 32 for charging the chamber 31 with compressed air. Suitable means in the form of a clevis 39 or the like is provided on the piston 20 adjacent the bulkhead 32 and on the housing 18 adjacent the bulkhead 19 for attachment to the strut 14 and each axle 13, as stated. Each shock absorber 16 may be oriented in any position. Conventional seals, such as O-rings or the like are employed between the abutting surfaces of the pistons 20, 24 and 29 as well as between the piston 20 and the bearing 22 and the bearing 21 and the housing 18 to prevent fluid leakage therebetween.

OPERATION OF THE PREFERRED EMBODIMENT

In the operation of each shock absorber 16 upon touchdown of the aircraft while landing, each piston 20 is telescoped into its chamber 23. This causes hydraulic fluid in the chamber 23 to flow through one or more holes 40 piercing the bearing 21 into the annular chamber 30 and through an orifice 41 in the closure or bulkhead 26 of the piston 20 into the chamber 25″. The holes 40 and orifice 41 are sized so as to control the rate of compression of the piston 20 into the housing 18. This, in turn, moves the first separator piston 24 compressing the air in the chamber 33.

During the short interval of initial landing impact very little hydraulic fluid flows through an orifice 42 in the inner end of the first separator piston 24 and very little air flows through the orifice 36 so that the movement of the slidable bulkhead 29 inside the piston 24 is negligible. This is due to the relatively small size of the orifices 42 and 36 as related to the holes or orifices 40 and 41.

Therefore, for all practical purposes the two separator pistons 24 and 29 act as a single unit during landing impact, the impact energy being absorbed by the flow of hydraulic fluid through the orifice 41 and holes 40. Rebound is controlled by a damper plate 43 operative between the bearings 21 and 22, which damper plate 43 is retained between the inner face of the bearing 21 and a fixed stop 44 carried by and projecting from the external surface of the piston 20 so as to act as a check valve.

At the end of the impact stroke, the telescoping of piston 20 will be essentially arrested in the position shown in FIG. 3. As the aircraft weight continues to exert a compressive force on the shock absorber 16, hydraulic fluid continues to gradually flow through the orifice 42 causing the bulkhead 29 to slide inside the piston 24 providing additional volume for fluid from the chamber 25′. This allows the shock absorber 16 to gradually compress as the aircraft continues its roll-out after the landing impact. Simultaneously air flows through the orifice 36 into chamber 33 until equilibrium is reached and the shock absorber 16 comes to rest at the position shown in FIG. 4.

During taxi the shock absorber 16 absorbs energy due for example to runway roughness by hydraulic fluid flow through orifice 41 and the accompanying compression of air in the chamber 33. Flow through orifices 42 and 36 is negligible at this time. Rebound damping is accomplished as during touchdown by hydraulic fluid flow from the chamber 30 through the holes 40 as restricted by the damper plate or check valve 43.

As can be seen from the above description, the shock absorber piston 20 is free to respond under both initial and secondary load pulses. It cannot, however, compress to the position shown in FIG. 4 until the preestablished time lapse as determined by the restricted fluid flow through the several holes and orifices 40, 41, 42 and 36.

What is claimed is:

1. A programmed oleo-pneumatic shock absorber for the interconnection of two relatively movable members comprising:
   an outer cylindrical housing terminating at one end in a closure wall;
   a first hollow cylindrical piston slidably mounted in the other end of said outer cylindrical housing for telescoping movement internally thereof, said piston terminating at opposite ends in closure walls;
   attachment means carried by the opposite outer ends of said housing and said first piston, one said attachment means adapted for connection to one of said relatively movable members and the other said attachment means adapted for connection to the other of said relatively movable members;
   a pair of bearings, one carried internally by said housing adjacent its said other end and one carried externally by said piston adjacent its end internally of said housing to facilitate the movement of said housing and said piston and to define an annular chamber therebetween;
   at least one passage of predetermined size piercing the bearing carried by said piston end to establish communication between the interior of said housing and said annular chamber;
   a check valve associated with each said passage to restrict fluid flow between the interior of said housing and said annular chamber;
   a second hollow cylindrical piston transversely filling, and slidably mounted on and against the inner wall of, said first piston for movement relative to said first piston and said housing, said second piston terminating at opposite ends in closure walls;
   a slidable bulkhead mounted internally of said second piston;
   a predetermined quantity of relatively incompressible fluid within said housing, said annular chamber and the ends of said first and second pistons on the side of said slidable bulkhead adjacent said one housing end;
   a predetermined quantity of relatively compressible fluid within the ends of said first and second pistons on the other side of said slidable bulkhead; and
   an orifice of predetermined size in the closure wall adjacent the aforesaid telescoping end of said first piston and an orifice of small size relative to said predetermined size in each of said closure walls of said second piston, whereby an initial displacement of said second piston occurs with virtually no displacement of said bulkhead relative to said second piston upon movement of said two relatively movable members and subsequently a measurable displacement of said bulkhead relative to said second piston occurs allowing additional movement of said two relatively movable members.

2. The shock absorber of claim 1 wherein said two relatively movable members are the main support strut and a crank arm carried by the axle of a surface contacting element of an aircraft landing gear unit.

3. The shock absorber of claim 1 wherein said predetermined quantity of relatively compressible and relatively incompressible fluid is such that said first piston is normally fully extended relative to said housing and said second piston and said slidable bulkhead are located adjacent the closure wall of said first piston.

4. The shock absorber of claim 3 wherein the size relationship of said orifices is such that the displacement of said first piston upon initial movement of said relatively movable members is from the fully extended position aforesaid to approximately midway of its telescoped position in said housing prior to said subsequent measurable displacement of said slidable bulkhead.

5. The shock absorber of claim 1 wherein the size relationship of said orifices is such that the fluid flow internally of said shock absorber causes the movement of said relatively movable members at two distinct different speeds throughout the length of travel thereof as determined by said piston and housing telescoping movement from the fully extended to the fully contracted positions, said telescoping movement being at a substantially greater speed during the initial part of said travel than during the latter part of said travel.

* * * * *